United States Patent [19]
Berke et al.

[11] 4,303,938
[45] Dec. 1, 1981

[54] PATTERN GENERATOR FOR SIMULATING IMAGE GENERATION

[75] Inventors: Herbert Berke, Maitland; John H. Allen, Winter Park, both of Fla.

[73] Assignee: The United States of America as represented by the Secretary of the Navy, Washington, D.C.

[21] Appl. No.: 114,002

[22] Filed: Jan. 21, 1980

[51] Int. Cl.³ ............................................... H04N 7/02
[52] U.S. Cl. ........................................ 358/139; 358/87
[58] Field of Search ........................... 358/139, 10, 87

[56] References Cited

U.S. PATENT DOCUMENTS

| | | | |
|---|---|---|---|
| 2,580,083 | 12/1951 | Doba | 358/139 |
| 2,741,722 | 4/1956 | Shields | 358/139 |
| 2,855,515 | 10/1958 | Bernard | 358/139 |
| 3,357,230 | 12/1967 | Topaz | 358/139 |
| 4,100,571 | 7/1978 | Dykes | 358/87 |
| 4,149,178 | 4/1979 | Estes | 358/139 |

*Primary Examiner*—Howard Britton
*Attorney, Agent, or Firm*—Richard S. Sciascia; Robert W. Adams; David S. Kalmbaugh

[57] ABSTRACT

A pattern generator for simulating image generation is disclosed which permits the testing of wide angle, non-programmed visual display systems including, for example, a 360° non-programmed visual display system. The program generator produces a pair of composite signals, the first of which may be utilized by an annular projector to project upon a screen a sawtooth waveform pattern, and the second of which may be utilized by the annular projector to project upon the screen a checkerboard pattern so as to facilitate the testing of wide angle visual display systems.

21 Claims, 8 Drawing Figures

PATTERN GENERATOR FOR SIMULATING IMAGE GENERATION

BACKGROUND OF THE INVENTION

1. Field of the Invention

This invention relates generally to the field of waveform generation. In particular this invention relates to a system for projecting upon a screen either a sawtooth waveform pattern or a checkerboard pattern.

2. Description of the Prior Art

There is now available a wide variety of devices which will project a fixed pattern, such as a sawtooth waveform or a checkerboard pattern, on a television receiver or the like. Most such devices of the prior art utilize cathode ray beam deflecting circuitry so as to provide a linear deflection in both the horizontal and vertical directions of the beam generated by television cameras, image reproducing, and other cathode ray beam devices. However, the aforementioned devices of the prior art, while acceptable for their intended purposes, will not function as testing apparatus for visual display systems such as that disclosed in U.S. Pat. No. 4,100,571 by Wiley V. Dykes and Frank J. Oharek, entitled 360° Non-Programmed Visual System, issued July 11, 1978.

SUMMARY OF THE INVENTION

The subject invention overcomes some of the disadvantages of the prior art, including those mentioned above, in that it comprises a relatively simple pattern generator which may be utilized to test visual display systems, including the 360° Non-Programmed Visual System disclosed in U.S. Pat. No. 4,100,571.

Incorporated in the subject invention is a clock generator for producing a clock signal; pulse shaping means, gating means, and timing means which, when uniquely combined, produce a first composite signal in response to the clock signal; and checkerboard pattern generating means for producing a second composite signal in response to the clock signal. An annular projector will then project upon a screen either a sawtooth waveform pattern in response to the first composite signal, or a checkerboard pattern in response to the second composite signal.

DESCRIPTION OF THE PREFERRED EMBODIMENT

Figure 1:
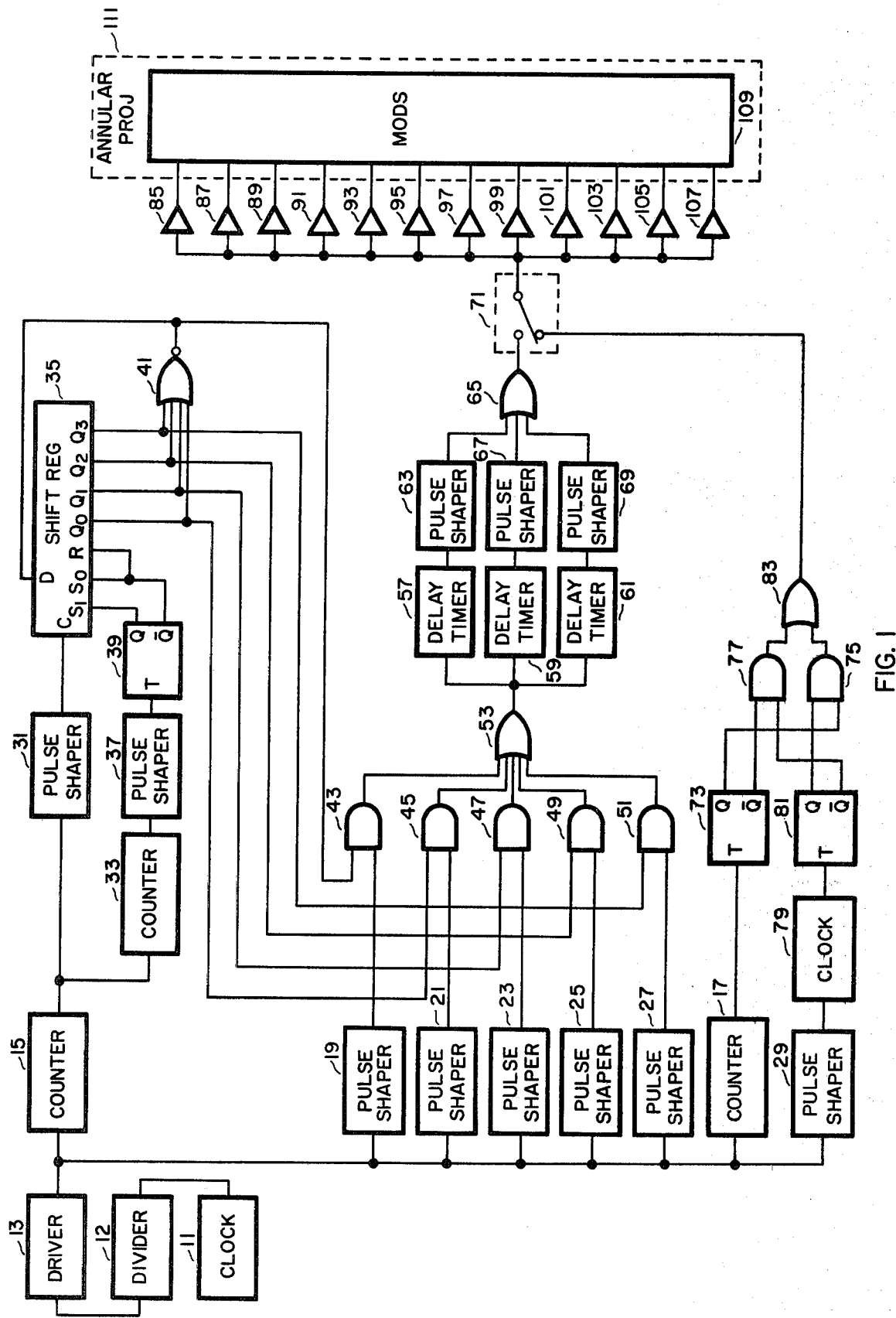
FIG. 1 illustrates a circuit diagram of the pattern generator constituting the subject invention.

The preferred embodiment of the subject invention will now be discussed in some detail in conjunction with all of the figures of the drawing, wherein like parts are designated by like reference numerals.

Figure 2:
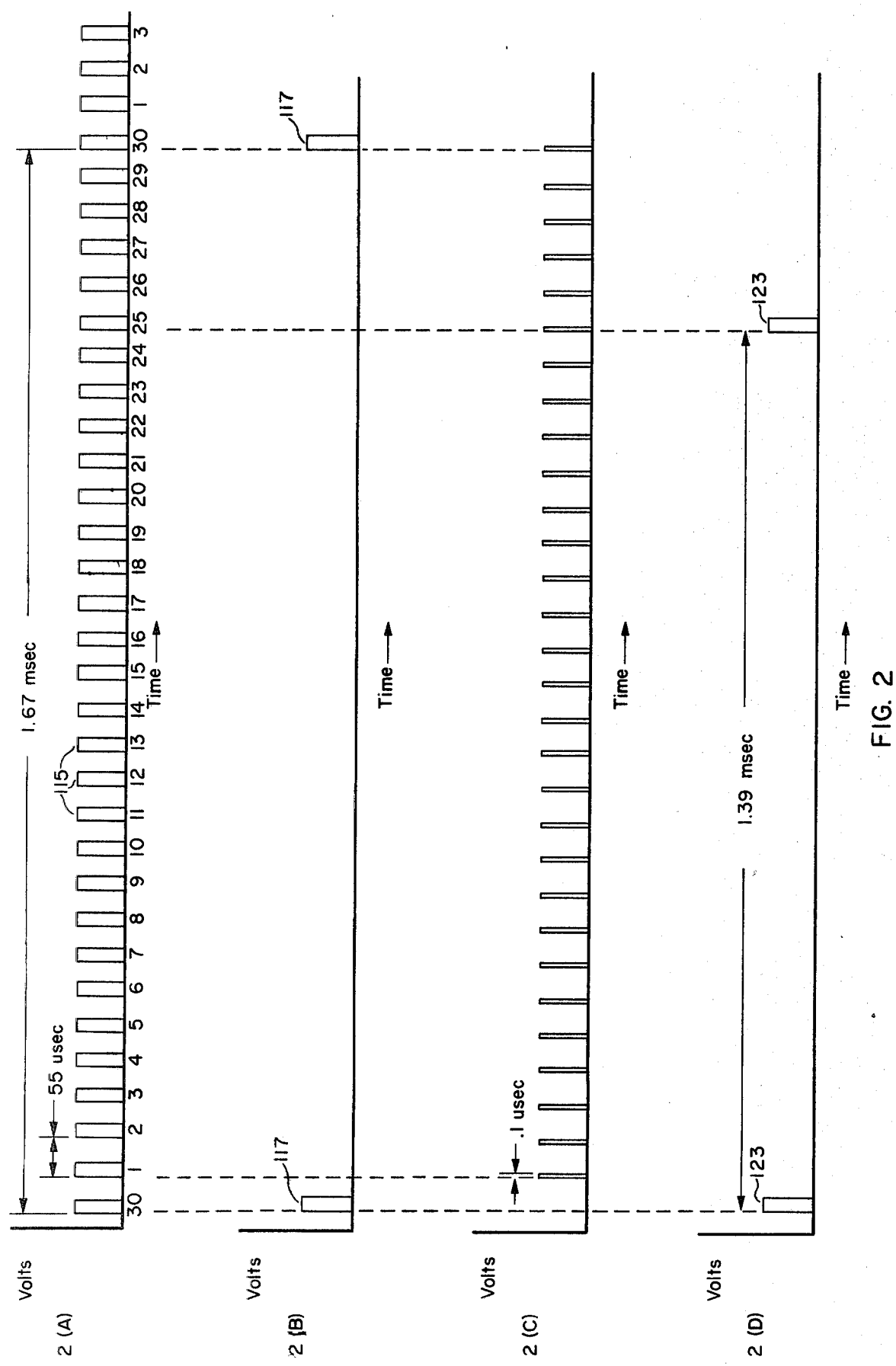
FIG. 2 is a graphical representation of various signals which occur at the outputs of some of the elements of FIG. 1.

Referring now to FIG. 1, there is shown a master clock generator 11, the output of which is connected to the input of a signal frequency divider 12. Master clock generator 11 produces a master clock signal having a series of fundamental clock pulses, the frequency of which has been preset at 18.72 megahertz. Signal frequency divider 12 divides the master clock signal by a predetermined number such that the clock signal appearing at the output of divider 12 has a frequency of eighteen kilohertz. Hence, the signal of FIG. 2(A) is for all practical purposes similar to the clock signal provided by divider 12.

At this time it may be noteworthy to mention that master clock generator 11 may be utilized as the master clock for a 360° non-programmed visual display system, the details of which are disclosed in U.S. Pat. No. 4,100,571, entitled 360° Non-Programmed Visual System, issued to Wiley V. Dykes and Frank J. Oharek. Also, it may be noted that the subject invention may be used to test the aforementioned 360° non-programmed visual display system, as will be discussed more fully below.

The output of signal frequency divider 12 is connected to the input of a driver 13. The output of driver 13 is effectively connected to the clock inputs of a pair of counters 15 and 17, the inputs of a quintet of pulse shapers 19, 21, 23, 25, and 27, and the input of a pulse shaper 29.

The output of counter 15 is connected to the input of a pulse shaper 31 and the clock input of a counter 33. The output of pulse shaper 31 is connected to the clock input of a shift register 35. The output of counter 33 is connected to the input of a pulse shaper 37, the output of which is connected to the trigger input of a flipflop 39. The Q output of flipflop 39 is connected to the $S_1$ input of shift register 35 and the $\overline{Q}$ output thereof is connected to the $S_0$ input of shift register 35 and the reset input of shift register 35.

The $Q_0$, $Q_1$, $Q_2$, and $Q_3$ outputs of shift register 35 are respectively connected to the first, second, third, and fourth inputs of a NOR gate 41, the output of which is connected to the data input of shift register 35, and the first input of an AND gate 43. Further, the $Q_0$, $Q_1$, $Q_2$, and $Q_3$ outputs of shift register 35 are respectively connected to the first inputs of AND gates 45, 47, 49, and 51.

At this time it may be noteworthy to mention that shift register 35 may be any conventional, well known, and commercially available shift register. In particular, it has been found that a 4-Bit Bidirectional Universal Shift Register, Model No. 74194, manufactured by Fairchild, Inc., of Mountain View, California, performs quite satisfactorily as shift register 35.

The outputs of pulse shapers 19, 21, 23, 25, and 27 are respectively connected to the second inputs of AND gates 43, 45, 47, 49, and 51. The outputs of AND gates 43, 45, 47, 49, and 51 are respectively connected to the first, second, third, fourth, and fifth inputs of an OR gate 53, the output of which is connected to the inputs of a trio of delay timers 57, 59, and 61.

The output of delay timer 57 is connected to the input of a pulse shaper 63, the output of which is connected to the first input of an OR gate 65. The output of delay timer 59 is connected to the input of a pulse shaper 67, with the output thereof connected to the second input of OR gate 65. The output of delay timer 61 is connected to the input of a pulse shaper 69, the output of which is connected to the third input of OR gate 65, with the output thereof connected to the first input of a switch 71.

At this time it would appear to be noteworthy to mention that pulse shapers 19 through 29, 31, 37, and 63 through 69, and delay timers 57 through 61 may be any conventional, well known, and commercially available one-shot multivibrator.

The output of counter 17 is connected to the trigger input of a flip-flop 73, with the Q output thereof connected to the first input of an AND gate 75 and the $\bar{Q}$ output thereof connected to the first input of AND gate 77.

The output of pulse shaper 29 is connected to the input of an oscillator 79. The output of oscillator 79 is connected to the trigger input of a flip-flop 81, with the Q output thereof connected to the second input of AND gate 75 and the $\bar{Q}$ output thereof connected to the second input of an AND gate 77. The output of AND gate 77 is connected to the first input of an OR gate 83, and the output of AND gate 75 is connected to the second input of OR gate 83, the output of which is connected to the second input of switch 71. The output of switch 71 is effectively connected to the inputs of twelve buffers 85 through 107 which, of course, may be any well known, conventional, and commercially available operational amplifier.

The outputs of buffers 85 through 107 are respectively connected to the inputs of twelve modulators 109 of an annular projector 111, which is an integral component of the aforementioned 360° non-programmed visual display system discussed in U.S. Pat. No. 4,100,571.

The operation of the subject invention will now be discussed in some detail in conjunction with all of the figures of the drawings.

As discussed previously, master clock generator 11 produces the master clock signal, the frequency of which has been preset at 18.72 megahertz. Signal frequency divider 12 then divides the master clock signal by 1040 such that the clock signal of FIG. 2(A) appears at the output of signal frequency divider 12. The frequency of the clock signal of FIG. 2(A), as noted above, is eighteen kilohertz. Thus, a clock pulse 115 appears at the output of frequency divider 12 every fifty-five microseconds.

The clock signal of FIG. 2(A) is supplied to the input of driver 13 which amplifies the clock signal of FIG. 2(A) so as to allow the aforementioned clock signal to activate counters 15 and 17 and pulse shapers 19 through 29.

Upon receiving thirty clock pulses 115, FIG. 2(A), from driver 13, counter 15 will produce at the output thereof a clock signal similar to that illustrated in the signal of FIG. 2(B).

At this time it may be noteworthy to mention that the clock signal of FIG. 2(B) has a series of clock pulses 117, the frequency of which is 600 hertz. Moreover, to facilitate the better understanding of that portion of the mode of operation of the invention to be discussed below, it should be noted that the clock signal of FIG. 3(A) is identical to the clock signal of FIG. 2(B); however, in the portrayal in FIG. 3(A), the time frame represented by the abscissa has been greatly reduced so as to provide a frame that will permit the disclosure of the signal shown in FIG. 3(B).

The clock signal of FIG. 2(B) is supplied to the input of pulse shaper 31, which expands the pulse width of each clock pulse 117, FIG. 2(B). The clock signal of FIG. 2(B) is then supplied to the clock input of shift register 35. Each clock pulse 117 of the clock signal of FIG. 2(B), as will be explained more fully below, functions to shift the data bits appearing at the data input of shift register 35 successively from the aforementioned data input through the $Q_0$, $Q_1$, $Q_2$, and $Q_3$ outputs of shift register 35.

The clock signal of FIG. 2(B) is also supplied to the clock input of counter 33. Upon receiving five clock pulses 117, FIG. 2(B), from counter 15, counter 33 will produce at the output thereof a signal similar to that illustrated in FIG. 3(B). At this time it may be mentioned that the signal of FIG. 3(B) has a series of pulses 119, the frequency of which is 120 hertz.

Figure 3:
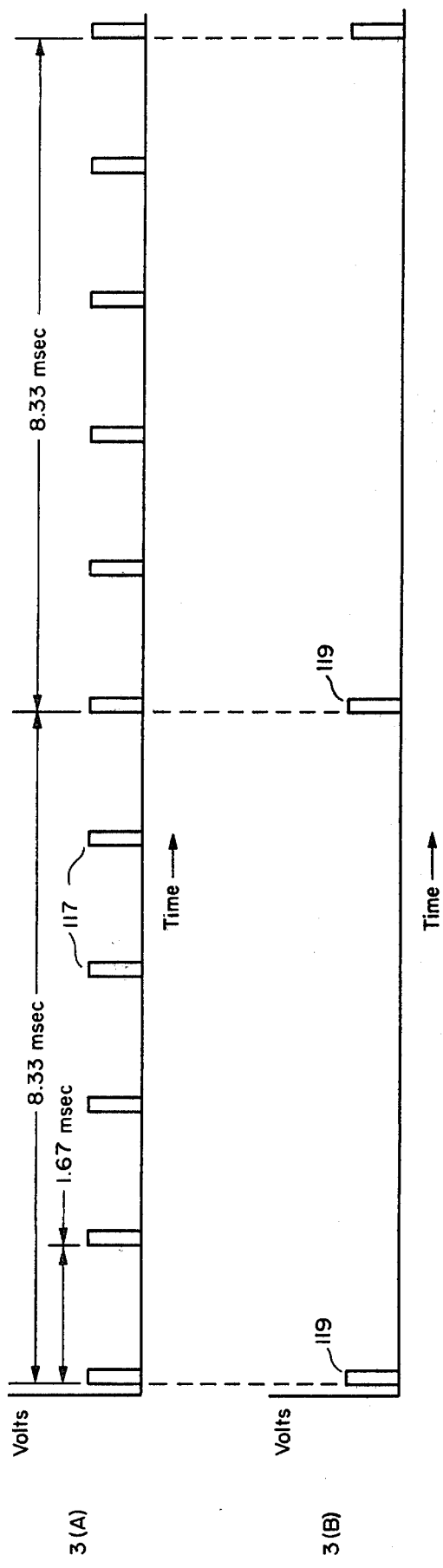
FIG. 3 is an expanded graphical illustration of one of the signals of FIG. 2 and another component output signal of the circuit of FIG. 1 coordinated therewith.

The clock signal of FIG. 3(B) is supplied to the input of pulse shaper 37 which expands the pulse width of each pulse 119, FIG. 3(B). The clock signal of FIG. 3(B) is then supplied to the trigger input of flip-flop 39, thereby causing the Q and $\bar{Q}$ outputs thereof to change state with every pulse 119 of the signal of FIG. 3(B).

When the $\bar{Q}$ output of flip-flop 39 is in the "0" state, the $S_0$ and R inputs of shift register 35 are inactivated. This, in turn, inhibits shift register 35 such that a data bit appearing at the data input thereof will not be shifted to the $Q_0$, $Q_1$, $Q_2$, or $Q_3$ outputs thereof by the clock pulses 117 of the clock signal of FIG. 2(B). Also to be noted is that whenever the R input of shift register 35 has a "0" applied thereto, the $Q_0$, $Q_1$, $Q_2$, and $Q_3$ outputs of shift register 35 will be in the "0" state.

When the $\bar{Q}$ output of flip-flop 39 is in the "1" state, the $S_0$ input of shift register 35 is activated. This, in turn, activates shift register 35 such that a data bit appearing at the data input thereof will successively be shifted from the aforementioned data input through the $Q_0$, $Q_1$, $Q_2$, and $Q_3$ outputs thereof with each clock pulse 117 of the clock signal of FIG. 2(B).

For the sake of clarity in discussing the operation of this portion of the subject invention, it may be assumed that the $Q_0$, $Q_1$, $Q_2$, and $Q_3$ outputs of shift register 35 are initially in the "0" state, and that the Q output of flip-flop 39 is initially in the "1" state. Thus, the output of NOR gate 41 will be in the "1" state, thereby presenting to the data input of shift register 35 a data bit having a "1" state.

Driver 13 then supplies the clock signal of FIG. 2(A) to the clock input of counter 15 as discussed previously, as well as the inputs of pulse shapers 19 through 27. Pulse shaper 19, in turn, produces at the output thereof a 0.1 microsecond duration data pulse, similar to that shown in FIG. 2(C).

Similarly, pulse shaper 21 produces a two microsecond duration data pulse, pulse shaper 23 produces a four microsecond duration data pulse, pulse shaper 25 produces a six microsecond duration data pulse, and pulse shaper 27 produces an eight microsecond duration data pulse.

Since the output of NOR gate 41 is in the "1" state, the 0.1 microsecond duration data pulses of FIG. 2(C) produced by pulse shaper 19 will pass through AND gate 43 and OR gate 53 to the inputs of delay timers 57, 59, and 61.

Figure 4:
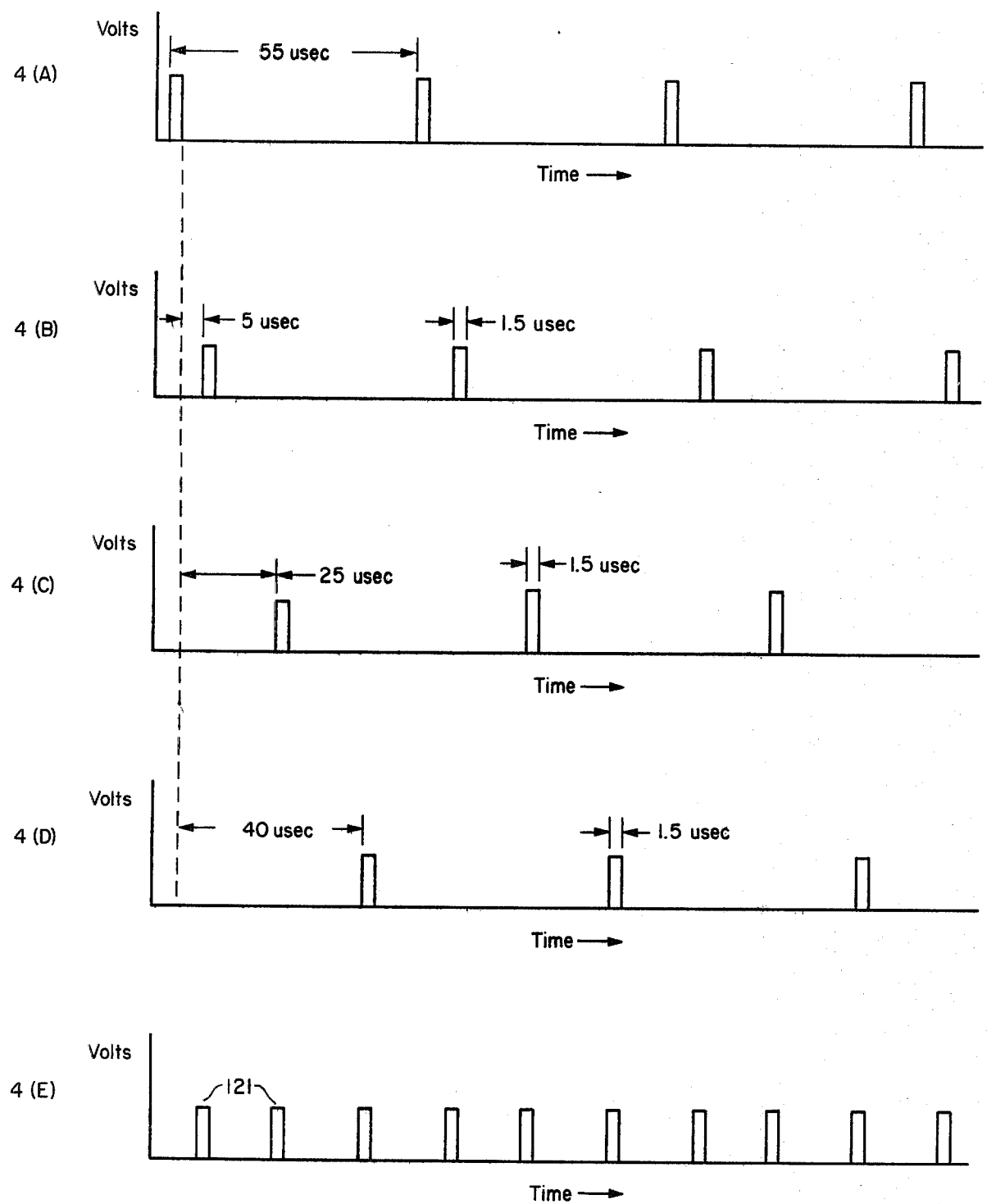
FIG. 4 is an expanded graphical illustration of one of the signals of FIG. 2 and other component output signals of the circuit of FIG. 1 coordinated therewith.

At this time it would appear to be noteworthy to mention that the signal of FIG. 4(A) is identical to that of FIG. 2(C), however the time frame represented by the abscissa of FIG. 4(A) has been greatly expanded so as to provide a frame that will permit the disclosure of the other signals shown in FIGS. 4(B), 4(C), and 4(D).

The 0.1 microsecond duration data pulse of FIG. 4(A), on the trailing edge thereof activates delay timers 57, 59, and 61. Delay timer 57 will, in turn, produce a five microsecond duration pulse, delay timer 59 will produce a twenty-five microsecond duration pulse, and delay timer 61 will produce a forty microsecond duration pulse.

The trailing edge of the five microsecond duration pulse produced by delay timer 57 activates pulse shaper 63 such that a signal, similar to that illustrated in FIG. 4(B), appears at the output of pulse shaper 63.

The trailing edge of the twenty-five microsecond duration pulse produced by delay timer 59 activates pulse shaper 67 such that a signal, similar to that illustrated in FIG. 4(C) appears at the output of pulse shaper 67.

The trailing edge of the forty microsecond duration pulse produced by delay timer 61 activates pulse shaper 69 such that a signal, similar to that illustrated in FIG. 4(D) appears at the output of pulse shaper 69.

The signals of FIGS. 4(B), 4(C), and 4(D) then pass through OR gate 65 so as to form a signal similar to that illustrated in FIG. 4(E), with each pulse 121 thereof having a duration of 1.5 microseconds.

As previously mentioned, upon receiving thirty clock pulses 115, FIG. 2(A), counter 15 will produce at the output thereof a clock pulse 117, FIG. 2(B), which, in turn, activates shift register 35 so as to shift the data bit from the data input of shift register 35 to the $Q_0$ output of shift register 35. This, in turn, changes the output of NOR gate 41 to the "0" state, thereby inhibiting the signal of FIG. 2(C) from passing through AND gate 43. For the sake of keeping this disclosure as simple as possible, the discussion of the operation of pulse shapers 21 through 27 and the circuitry associated therewith will be greatly simplified, since pulse shapers 21 through 27 and the circuitry associated therewith operate in a manner very similar to that described for pulse shaper 19 and its associated circuitry.

Figure 5:
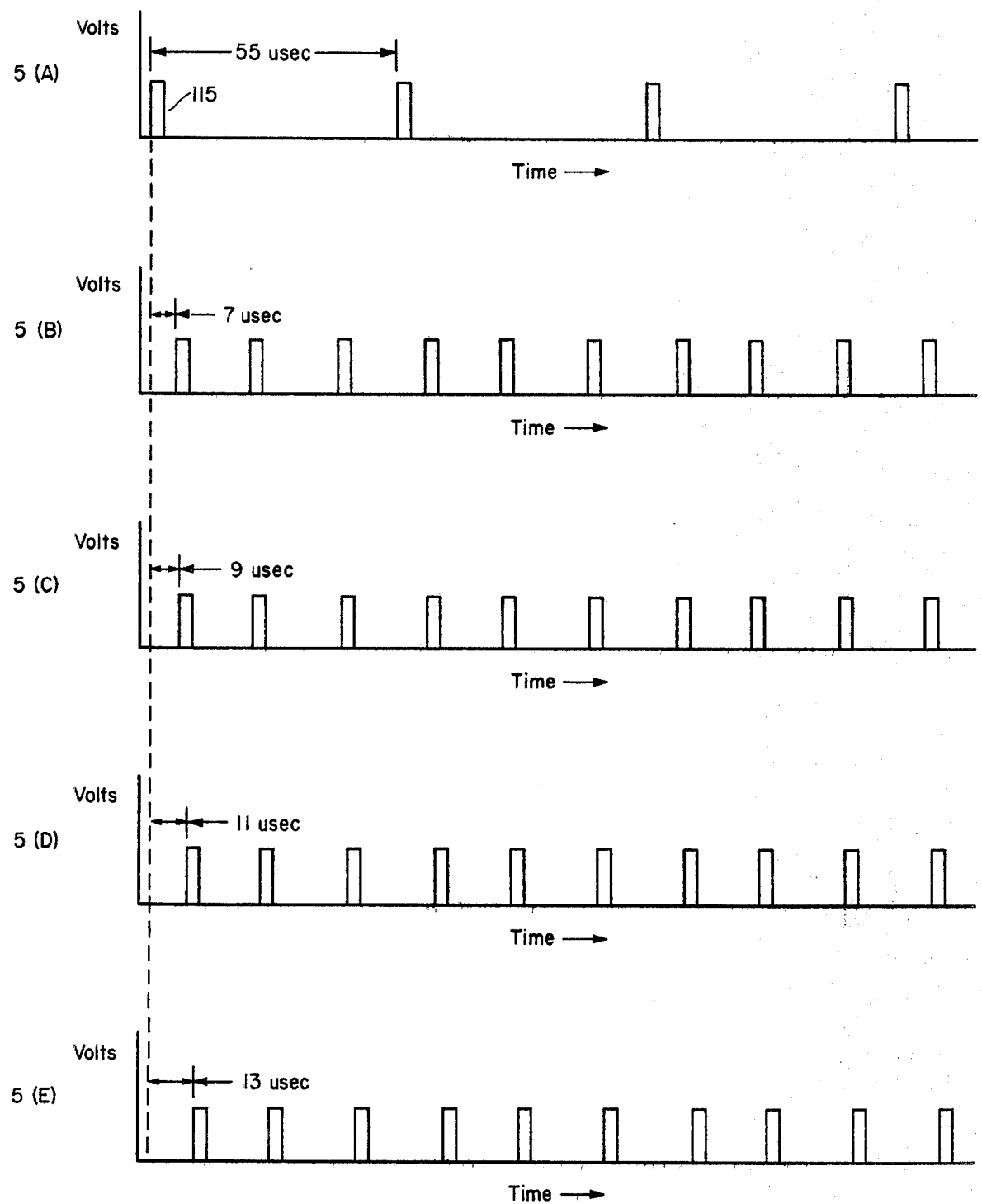
FIG. 5 is an expanded graphical illustration of one of the signals of FIG. 2 and other component output signals of the circuit of FIG. 1 coordinated therewith.

Also to be noted is that the signal of FIG. 5(A) is identical to that of FIG. 2(A), except that the time frame represented by the abscissa has been expanded so as to provide a frame that will permit the disclosure of the other signals shown in FIGS. 5(B) through 5(E).

When the $Q_0$ output of shift register 35 changes from the "0" state to the "1" state, AND gate 45 will pass therethrough the two microsecond data pulses produced by pulse shaper 21. This, in turn, causes a signal, similar to that illustrated in FIG. 5(B), to appear at the output of OR gate 65.

Similarly, upon receiving a second clock pulse 117, FIG. 2(B), from counter 15, the data bit within shift register 35 will be shifted from the $Q_0$ output of shift register 35 to the $Q_1$ output of shift register 35, thereby causing the $Q_0$ output thereof to be in the "0" state and the $Q_1$ output thereof to be in the "1" state. This, in turn, prevents the two microsecond duration data pulses produced by pulse shaper 21 from passing through AND gate 45, and allows the four microsecond data pulses produced by pulse shaper 23 to pass through AND gate 47, with the result that the signal of FIG. 5(C) will appear at the output of OR gate 65.

Upon receiving a third clock pulse 117, FIG. 2(B), from counter 15, the data bit within shift register 35 will be shifted from the $Q_1$ output of shift register 35 to the $Q_2$ output of shift register 35, thereby causing the $Q_1$ output thereof to be in the "0" state and the $Q_2$ output thereof to be in the "1" state. This, in turn, prevents the four microsecond duration data pulse produced by pulse shaper 23 from passing through AND gate 47, and allows the six microsecond data pulse produced by pulse shaper 25 to pass through AND gate 49, with the result that the signal of FIG. 5(D) will appear at the output of OR gate 65.

Upon receiving a fourth clock pulse 117, FIG. 2(B), from counter 15, the data bit within shift register 35 will be shifted from the $Q_2$ output of shift register 35 to the $Q_3$ output of shift register 35, thereby causing the $Q_2$ output thereof to be in the "0" state and the $Q_3$ output thereof to be in the "1" state. This, in turn, prevents the six microsecond duration data pulse produced by pulse shaper 25 from passing through AND gate 49, and allows the eight microsecond duration data pulse produced by pulse shaper 27 to pass through AND gate 51 with the result that the signal of FIG. 5(E) will appear at the output of OR gate 65.

As mentioned above, upon receiving five clock pulses 117, FIG. 2(B), from counter 15, counter 33 will produce at the output thereof a signal similar to that illustrated in FIG. 3(B). This, in turn, causes the $Q$ and $\bar{Q}$ outputs of flipflop 39 to change state such that the $Q$ output thereof will be in the "1" state and the $\bar{Q}$ output thereof will be in the "0" state.

The $\bar{Q}$ output of flipflop 39 is then supplied to the $S_0$ and R outputs of shift register 35, thereby causing the $Q_3$ output thereof to change to the "0" state. This allows the signal of FIG. 2(C) to pass through AND gate 43 with the result that the signal of FIG. 4(E) will appear at the output of OR gate 65 for a time period of 8.34 milliseconds.

Thus, the composite signal supplied from OR gate 65 though switch 71 to the inputs of buffers 85 through 107 includes, in sequence, the signals of FIGS. 4(E), 5(B), 5(C), 5(D), and 5(E), each of which has a duration of 1.67 milliseconds, and the signal of FIG. 4(E) which has a duration of 8.34 milliseconds.

Figure 7:
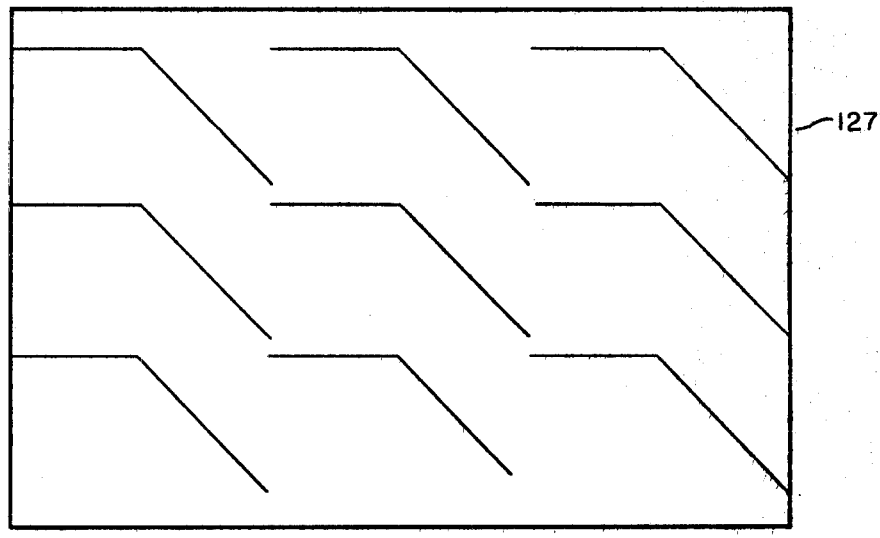
FIG. 7 is a pictorial representation of a sawtooth waveform pattern projected upon a screen by the invention of FIG. 1.

The aforementioned signal is, in turn, converted by buffers 85 through 107 to twelve sawtooth waveform signals which are then supplied to the inputs of the twelve modulators 109 of annular projector 111. Annular projector 111 will then project, in response to the aforementioned sawtooth waveform signals, upon a screen 127, FIG. 7, the sawtooth waveform pattern of FIG. 7.

Reference is again made to U.S. Pat. No. 4,100,571, entitled 360° Non-Programmed Visual System, for a complete description of the operation of annular projector 111.

As mentioned above, the clock signal of FIG. 2(A) activates counter 17. Upon receiving twenty-five clock pulses 115, FIG. 2(A), from driver 13, counter 17 will produce at the output thereof a signal similar to that illustrated in the signal of FIG. 2(D). The frequency of the signal of FIG. 2(D) is 720 hertz. Thus a pulse 123 appears at the output of counter 17 every 1.39 milliseconds.

For the sake of clarity in describing this portion of the operation of the subject invention, it may be assumed that the $\overline{Q}$ output of flipflop 73 is initially in the "1" state. Also, it may be noted that the signal of FIG. 6(A) is, in fact, identical to that of FIG. 2(A) except that the time frame represented by the abscissa has been greatly expanded so as to provide a frame that will permit the disclosure of the other signals shown in FIGS. 6(B) through 6(E).

The first pulse 123 of the signal of FIG. 2(D) supplied to flipflop 73 will cause the Q output thereof to be in the "1" state and the $\overline{Q}$ output thereof to be in the "0" state. This, in turn, opens AND gate 75 and inhibits AND gate 77.

Figure 6:
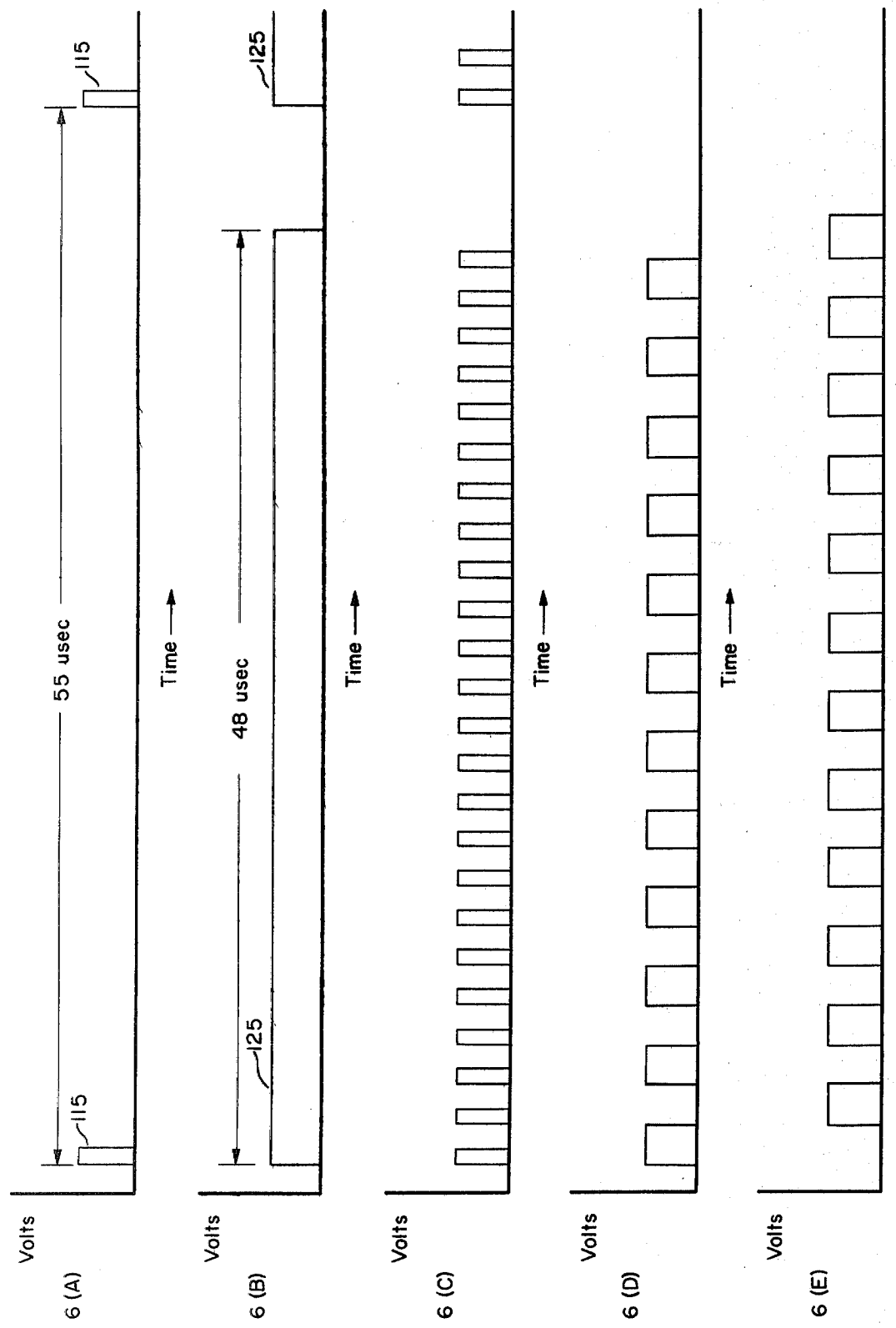
FIG. 6 is an expanded graphical representation of one of the signals of FIG. 2 and other component output signals of the circuit of FIG. 1 coordinated therewith.

The clock signal of FIG. 2(A) is also supplied to the input of pulse shaper 29, which produces at the output thereof a forty-eight microsecond duration pulse 125, FIG. 6(B), in response to each of the clock pulses 115 of the signal of FIG. 2(A). Each pulse 125, FIG. 6(B), in turn, activates oscillator 79 for a time interval of forty-eight microseconds so as to cause oscillator 79 to produce at the output thereof a signal similar to that illustrated in FIG. 6(C). The signal of FIG. 6(C) is then divided by a factor of two by flipflop 81. This results in a signal similar to that illustrated in FIG. 6(D) appearing at the Q output of flipflop 81 and a signal similar to that illustrated in FIG. 6(E) appearing at the $\overline{Q}$ output of flipflop 81. The signal of FIG. 6(D) will then pass through AND gate 75, OR gate 83, and switch 71 to the inputs of buffers 85 through 107.

Upon receiving twenty-five additional clock pulses 115, FIG. 2(A), from driver 13, counter 17 will produce at the output thereof a second pulse 123, FIG. 2(D), which triggers flipflop 73 so as to open AND gate 77 and inhibit AND gate 75. This, in turn, allows the signal of FIG. 6(E) to pass through AND gate 77, OR gate 83, and switch 71 to the inputs of buffers 85 through 107. Thus the composite signal supplied from OR gate 83 through switch 71 to the inputs of buffers 85 through 107 includes, in sequence, the signals of FIGS. 6(D) and 6(E).

Figure 8:
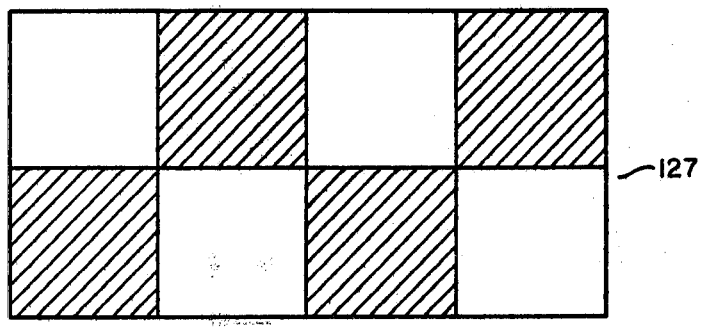
FIG. 8 is a pictorial representation of a checkerboard pattern projected upon the screen by the invention of FIG. 1.

The aforementioned signal is, in turn, converted by buffers 85 through 107 to twelve checkerboard pattern waveform signals which are then supplied to the inputs of the twelve modulators 109 of annular projector 111. Annular projector 111 will then project, in response to the aforementioned checkerboard pattern waveform signals, upon screen 127, the checkerboard pattern of FIG. 8.

In addition to the use of the subject invention for testing the 360° non-programmed visual display system disclosed in U.S. Pat. No. 4,100,571, it is also suggested that another form of the invention might be used to test cathode ray beam devices, including those utilized as picture tubes in television sets.

From the foregoing it may readily be seen that the subject invention comprises a new, unique, and exceedingly useful pattern generator for simulating image generation which constitutes a considerable improvement over the known prior art. Obviously, many modifications and variations of the present invention are possible in light of the above teachings. It is, therefore, to be understood that within the scope of the appended claims the invention may be practiced otherwise than as specifically described.

What is claimed is:

1. A pattern generator for simulating image generation comprising, in combination:

clock generating means having an output for producing a clock signal, said clock signal having a plurality of clock pulses;

pulse shaping means having a quintet of inputs effectively connected to the output of said clock generating means and a quintet of outputs for providing, in response to each of the clock pulses of said clock signal, a quintet of data pulses, each of which has a predetermined pulse width;

gating means, having a clock input connected to the output of said clock generating means, a quintet of data inputs effectively and respectively connected to the quintet of outputs of said pulse shaping means and an output adapted for passing, in sequence, a set of the first of said quintet of data pulses, a set of the second of said quintet of data pulses, a set of the third of said quintet of data pulses, a set of the fourth of said quintet of data pulses, and a set of the fifth of said quintet of data pulses;

timing means having an input connected to the output of said gating means and an output adapted for delaying, in sequence, each set of said quintet of data pulses passed by said gating means for a first time interval, a second time interval, and a third time interval so as to form at the output thereof a first composite signal; and checkerboard pattern generating means having an input connected to the output of said clock generating means and an output for providing at the output thereof a second composite signal.

2. The pattern generator of claim 1, wherein said clock generating means comprises:

a master clock generator having an output;

a divider having an input connected to the output of said master clock generator and an output; and a driver having an input connected to the output of said divider.

3. The pattern generator of claim 1, wherein said pulse shaping means comprises a quintet of pulse shapers, each of which has an input connected to the output of said clock generating means.

4. The pattern generator of claim 3, wherein each of said quintet of pulse shapers comprises a one-shot multivibrator.

5. The pattern generator of claim 1, wherein said gating means comprises:

a first counter having a clock input connected to the output of said clock generating means and an output;

a second counter having a clock input connected to the output of said first counter and an output;

a first pulse shaper having an input connected to the output of said first counter, and an output;

a second pulse shaper having an input connected to the output of said second counter and an output;

a flipflop having a trigger input connected to the output of second pulse shaper, a Q output and a $\overline{Q}$ output;

a shift register having a clock input connected to the output of said first pulse shaper, an $S_1$ input connected to the Q output of said flipflop, an $S_0$ input connected to the $\overline{Q}$ output of said flipflop, a reset input connected to the $\overline{Q}$ output of said flipflop, a data input, and $Q_0$, $Q_1$, $Q_2$, and $Q_3$ outputs;

a NOR gate having first, second, third, and fourth inputs respectively connected to the $Q_0$, $Q_1$, $Q_2$, and $Q_3$ outputs of said shift register, and an output connected to the data input of said shift register;

a first AND gate having a first input connected to the output of said NOR gate, a second input connected to the first of the quintet of outputs of said pulse shaping means, and an output;

a second AND gate having a first input connected to the $Q_0$ output of said shift register gate, a second input connected to the second of the quintet of outputs of said pulse shaping means, and an output;

a third AND gate having a first input connected to the $Q_1$ output of said shift register, a second input connected to the third of the quintet of outputs of said pulse shaping means, and an output;

a fourth AND gate having a first input connected to the $Q_2$ output of said shift register, a second input connected to the fourth of the quintet of outputs of said pulse shaping means, and an output;

a fifth AND gate having a first input connected to the $Q_3$ output of said shift register, a second input connected to the fifth of the quintet of outputs of said pulse shaping means, and an output; and an OR gate having first, second, third, fourth, and fifth inputs respectively connected to the outputs of said first, second, third, fourth, and fifth AND gates.

6. The pattern generator of claim 5, wherein said first and second pulse shapers are one-shot multivibrators.

7. The pattern generator of claim 1, wherein said timing means comprises:

a first delay timer having an input connected to the output of said gating means, and an output;

a first pulse shaper having an input connected to the output of said first delay timer;

a second delay timer having an input connected to the output of said gating means, and an output;

a second pulse shaper having an input connected to the output of said second delay timer;

a third delay timer having an input connected to the output of said gating means, and an output;

a third pulse shaper having an input connected to the output of said third delay timer, and an output; and an OR gate having first, second, and third inputs respectively connected to the outputs of said first, second, and third pulse shapers.

8. The pattern generator of claim 7, wherein said first, second, and third delay timers are one-shot multivibrators.

9. The pattern generator of claim 7, wherein said first, second, and third pulse shapers are one-shot multivibrators.

10. The pattern generator of claim 1, wherein said checkerboard pattern generating means comprises:

a counter having a clock input connected to the output of said clock generating means, and an output;

a pulse shaper having an input connected to the output of said clock generating means, and an output;

an oscillator having an input connected to the output of said pulse shaper and an output;

a first flipflop having a trigger input connected to the output of said counter, a Q output and a $\overline{Q}$ output;

a second flipflop having a trigger input connected to the output of said oscillator, a Q output and a $\overline{Q}$ output;

a first AND gate having a first input connected to the $\overline{Q}$ output of said flipflop, a second input connected to the Q output of said second flipflop, and an output;

a second AND gate having a first input connected to the Q output of said first flipflop, a second input connected to the $\overline{Q}$ output of said second flipflop, and an output; and an OR gate having a first input connected to the output of said first AND gate, and a second input connected to the output of said second AND gate.

11. The pattern generator of claim 10, wherein said pulse shaper is a one-shot multivibrator.

12. The pattern generator of claim 1, further characterized by projecting means having a first input connected to the output of said timing means, and a second input connected to the output of said checkerboard pattern generating means adapted for broadcasting upon a screen either a sawtooth waveform pattern in response to the first composite signal provided by said timing means, or a checkerboard pattern in response to the second composite signal provided by said checkerboard pattern generating means.

13. The pattern generator of claim 12, wherein said projecting means comprises:

a switch having a first input connected to the output of said timing means, a second input connected to the output of said checkerboard pattern generating means, and an output;

a plurality of buffers, each of which has an input connected to the output of said switch and an output; and an annular projector having a plurality of inputs respectively connected to the outputs of said plurality of buffers.

14. A signal generating system comprising in combination:

a master clock generator having an output;

a divider having an input connected to the output of said master clock generator and an output;

a first counter having a clock input effectively connected to the output of said divider and an output;

a second counter having a clock input connected to the output of said first counter and an output;

a first flipflop having a trigger input effectively connected to the output of said second counter, a Q output and a $\overline{Q}$ output;

a shift register having a clock input effectively connected to the output of said first counter, an $S_1$ input connected to the Q output of said first flipflop, a reset input connected to the Q output of said first flipflop, an $S_0$ input connected to the $\overline{Q}$ output of said first flipflop, a data input, and $Q_0$, $Q_1$, $Q_2$, and $Q_3$ outputs;

a NOR gate having first, second, third, and fourth inputs respectively connected to the $Q_0$, $Q_1$, $Q_2$, and $Q_3$ outputs of said shift register, and an output connected to the data input of said shift register;

a first pulse shaper having an input effectively connected to the output of said divider and an output;

a second pulse shaper having an input effectively connected to the output of said divider and an output;

a third pulse shaper having an input effectively connected to the output of said divider and an output;

a fourth pulse shaper having an input effectively connected to the output of said divider and an output;

a fifth pulse shaper having an input effectively connected to the output of said divider and an output;

a first AND gate having a first input connected to the output of said NOR gate, a second input connected to the output of said first pulse shaper, and an output;

a second AND gate having a first input connected to the $Q_0$ output of said shift register, a second input connected to the output of said second pulse shaper, and an output;

a third AND gate having a first input connected to the $Q_1$ output of said shift register, a second input connected to the output of said third pulse shaper, and an output;

a fourth AND gate having a first input connected to the $Q_2$ output of said shift register, a second input connected to the output of said fourth pulse shaper, and an output;

a fifth AND gate having a first input connected to the $Q_3$ output of said shift register, a second input connected to the output of said fifth pulse shaper, and an output;

a first OR gate having first, second, third, fourth, and fifth inputs respectively connected to the outputs of said first, second, third, fourth, and fifth AND gates;

a first delay timer having an input connected to the output of said OR gate, and an output;

a second delay timer having an input connected to the output of said OR gate, and an output;

a third delay timer having an input connected to the output of said OR gate, and an output;

a sixth pulse shaper having an input connected to the output of said delay timer, and an output;

a seventh pulse shaper having an input connected to the output of said second delay timer, and an output;

an eighth pulse shaper having an input connected to the output of said third delay timer, and an output;

a second OR gate having first, second, and third inputs respectively connected to the outputs of said sixth, seventh, and eighth pulse shapers;

a third counter having a clock input effectively connected to the output of said divider, and an output;

a second flipflop having a trigger input connected to the output of said counter, a Q output, and a $\overline{Q}$ output;

a ninth pulse shaper having an input connected to the output of said divider, and an output;

an oscillator having an input connected to the output of said ninth pulse shaper, and an output;

a third flipflop having a trigger input connected to the output of said oscillator, a Q output, and a $\overline{Q}$ output;

a sixth AND gate having a first input connected to the $\overline{Q}$ output of said second flipflop, a second input connected to the $\overline{Q}$ output of said third flipflop, and an output;

a seventh AND gate having a first input connected to the Q output of said second flipflop, a second input connected to the Q output of said third flipflop, and an output;

a third OR gate having a first input connected to the output of said sixth AND gate, a second input connected to the output of said seventh AND gate, and an output; and a switch having a first input connected to the output of said second OR gate, a second input connected to the output of said third OR gate, and an output.

15. The signal generating system according to claim 14, further characterized by a driver connected between the output of said divider and the inputs of said first and third counters, and said first, second, third, fourth, fifth, and ninth pulse shapers.

16. The signal generating system according to claim 14, further characterized by a pulse shaper connected between the output of said first counter and the clock input of said shift register.

17. The signal generating system according to claim 14, further characterized by a pulse shaper connected between the output of said second counter and the trigger input of said first flipflop.

18. The signal generating system according to claim 14, wherein said first, second, third, fourth, fifth, sixth, seventh, eighth, and ninth pulse shapers are one-shot multivibrators.

19. The signal generating system according to claim 14, wherein said first, second, and third delay timers are one-shot multivibrators.

20. The signal generating system according to claim 14, further characterized by a plurality of buffers, each of which has an input connected to the output of said switch, and an output.

21. The signal generating system according to claim 20, further characterized by an annular projector having a plurality of inputs respectively connected to the outputs of said plurality of buffers.

* * * * *